United States Patent [19]
Leis

[11] Patent Number: 4,458,125
[45] Date of Patent: Jul. 3, 1984

[54] REPAIR METHOD AND APPARATUS

[75] Inventor: Brian N. Leis, Columbus, Ohio

[73] Assignee: Battelle Memorial Institute, Columbus, Ohio

[21] Appl. No.: 439,682

[22] Filed: Nov. 8, 1982

Related U.S. Application Data

[63] Continuation-in-part of Ser. No. 291,195, Aug. 10, 1981, abandoned.

[51] Int. Cl.³ .............................................. H05B 6/38
[52] U.S. Cl. .............................. 219/10.41; 219/10.43; 219/10.57; 219/10.73
[58] Field of Search ............... 219/10.41, 10.43, 10.57, 219/7.5, 9.5, 10.67, 10.69, 10.71, 10.73, 10.75, 10.49; 29/402.04, 402.08, 401; 228/119, 193, 196, 243

[56] References Cited
U.S. PATENT DOCUMENTS

| | | | |
|---|---|---|---|
| 3,963,163 | 6/1976 | Oshida | 228/196 |
| 4,098,450 | 7/1978 | Keller et al. | 228/119 |
| 4,300,031 | 11/1981 | Reboux et al. | 219/10.75 |

Primary Examiner—C. L. Albritton
Assistant Examiner—M. Lateef
Attorney, Agent, or Firm—Robert B. Watkins; Philip M. Dunson

[57] ABSTRACT

A method and apparatus for repairing rails and other structural elements which have become cracked or have defects, in and by which the rail or other element is gripped and held to a substantially fixed distance between the gripping points while being heated above the diffusion bonding temperature for a period of time sufficient for diffusion bonding to take place, and for the crack or defect to be repaired by compression through thermal expansion of the element.

12 Claims, 7 Drawing Figures

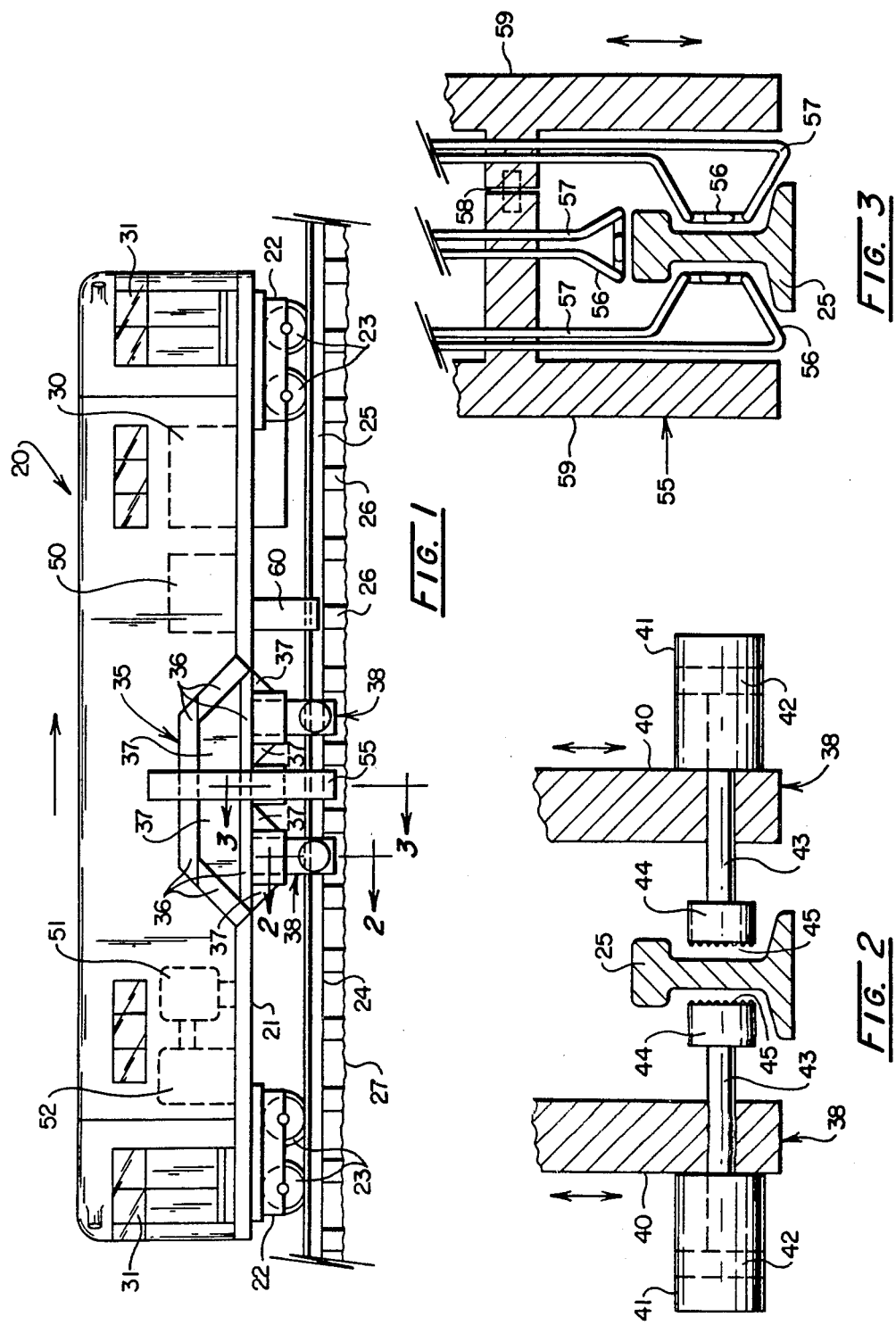

REPAIR METHOD AND APPARATUS

This application is a continuation in part of co-pending application by the same inventor, Ser. No. 291,195, filed Aug. 10, 1981, entitled, REPAIR METHOD AND APPARATUS, now abandoned.

SUMMARY OF THE INVENTION

This invention relates to a method and apparatus for repairing structural elements such as rails which have become cracked and/or develop other defects. More particularly, it relates to a method and apparatus for repairing rails and other elements in place without removing them from their working positions and without the addition of materials or reinforcing elements.

Briefly and in summary, the invention is a method of repairing defects in structural elements comprising: gripping the structural element at positions on opposite sides of the defect with substantially unyielding means to hold the element a substantially fixed distance between the gripping positions on the member, and heating the element to a diffusion bonding temperature while creating a force of thermal expansion sufficient to diffusion bond the defect and the opposite near sides of the defect at the diffusion bonding temperatures under the force of thermal expansion of the element, and cooling the element and releasing the element.

The invention includes apparatus having means for gripping the structural element on opposite sides of a defect in the element, the gripping means being supported by substantially unyielding frame means capable of supporting the gripping means at a substantially fixed distance apart, and having means for heating the structural member in and adjacent to the defect to a temperature sufficiently high to diffusion bond the material of the structural member near and in the crack by the force of thermal expansion created in the restrained structural member.

It is well known that many structural members including rails and beam-like elements develop defects, cracks, and structural discontinuities while in use. Primary examples are railroad rails made of steel. However, other examples include pipes, struts, truss members and diverse frame members in bridges, roof trusses, etc.

As used herein, these defects and discontinuities will be termed defects or "cracks" interchangeably and it is intended that this term shall include visible and invisible separations, weaknesses, internal changes in chemistry of the material, etc. These cracks are discernible in various ways such as visual inspection or ultrasonic and radiometric testing.

Because of the usually heavy loads and high stresses under which these elements operate, cracks can be the forerunners of failures of even catastrophic proportions. There is great concern for the growth of transverse defects in railroad rails since continued growth of the crack can lead to high speed derailment and concomitant loss of life and property.

Current practice is to detect these defects using nondestructive techniques such as shear wave ultrasonics. Once detected, the cracks are removed by cutting out the defective region and welding in a section of rail as a "repair plug". Such a process involves making two cuts in the rail; i.e., one on each side of the defective region, cutting a repair plug to size, and making two welds, one at each cut to secure the plug in place. After the plug is welded in place the wearing surface of the rail must be ground smooth and continuously even.

A further discussion of prior art methods of rail repair will be found in U.S. Pat. No. 3,623,207 which specifically relates to a method that consists in cutting and removing only a part of the head of the rail where the transverse defect has been detected, then filling the space with a thermit weld.

The present invention is a simple and economical alternative to this above described current practice, circumventing much of the time involved and avoiding the uncertain performance of the welded repair plug. In the welded repair plug technique, since welding procedures are not perfect, there is a possibility that the welds and the rail in the vicinity of the welds will develop cracks and imperfections either during or after the welding process. Therefore, a further inspection must be made and the welded sections are a source of continuing concern from a reliability standpoint.

Transverse cracks in rails, at the time they are detected, may be internal or external but represent a small fraction of the rail cross-section. Rails are typically made from AISI 1080 steel in an unheat treated form. These steels and other hot rolled steels of similar composition may be heated to at least the phase boundary A-1 (about 1333° F.) temperature but less than about 2000° F. and thereafter slow cooled, after which such steels do not exhibit significant changes in microstructure or mechanical properties as compared to other materials. At such high temperatures the diffusion process is enhanced to such an extent that temperature coupled with compression applied perpendicular to the internal crack promotes diffusion bonding across the crack plane.

The National Aeronautics and Space Administration has caused to be published a report BROAD APPLICATIONS OF DIFFUSION BONDING BY B. R. GARRETT, G. F. BLANK, and A. J. RANADIVE—NASA CR-409. This publication covers diffusion bonding as the art was known at the time of its publication. As presented therein in greater depth, the diffusion theory and process is well known and exists with regard to all materials. By this process the atoms of one material move into spaces in the grains or molecules of another material. The ease with which diffusion bonding can be effected depends on the materials to be bonded, the conditions of temperature and pressure during the bonding action, and the surface conditions between the two materials.

Although much is known and is published about diffusion bonding, little is apparently known about diffusion within a single material and particularly a "bonding" or "rebonding" of portions of the material to an integral whole by enhanced diffusion action. This "repair" method has been found to have many advantages which will be further described herein. In addition, it is significant that while much is understood about diffusion bonding of separate materials, little or nothing is found in the prior art on internal bonding of the same material as a repair process.

From the foregoing discussion, it will be seen that it is an object of this invention to provide a method and apparatus for repairing structural elements, and particularly rails, in situ at their place of use, without the necessity of removing them to another place where the cracks and defects can be corrected. It is a further purpose to accomplish repair of defects and cracks by a simple process that does not require the removal of any portion of the structural element and its replacement with new material.

It is the further purpose to accomplish the repair of rails and structural elements by a diffusion process of internally restructuring material of the element at the site of the defect in a process under control and manipulation by the operators.

Still another purpose is to accomplish repair of defects, cracks in structural elements and rails, in a more economical and operationally simplified method.

The foregoing and other advantages of the invention will become apparent from the following disclosure in which a preferred embodiment of the invention is described in detail and illustrated in the accompanying drawings. It is contemplated that variations in procedures, structural features and arrangements of parts may appear to the person skilled in the art, without departing from the scope or sacrificing any of the advantages of the invention.

DESCRIPTION OF THE DRAWINGS

FIG. 1 is an elevational view of a railroad car constructed to transport the apparatus of this invention and those who practice the method of the invention.

FIG. 2 is an elevational cross-section view of a portion of the apparatus of this invention taken along the line 2—2 of FIG. 1.

FIG. 3 is an elevational cross-section view of a portion of the apparatus of this invention taken along the line 3—3 of FIG. 1.

DETAILED DESCRIPTION OF THE INVENTION

Figure 4:
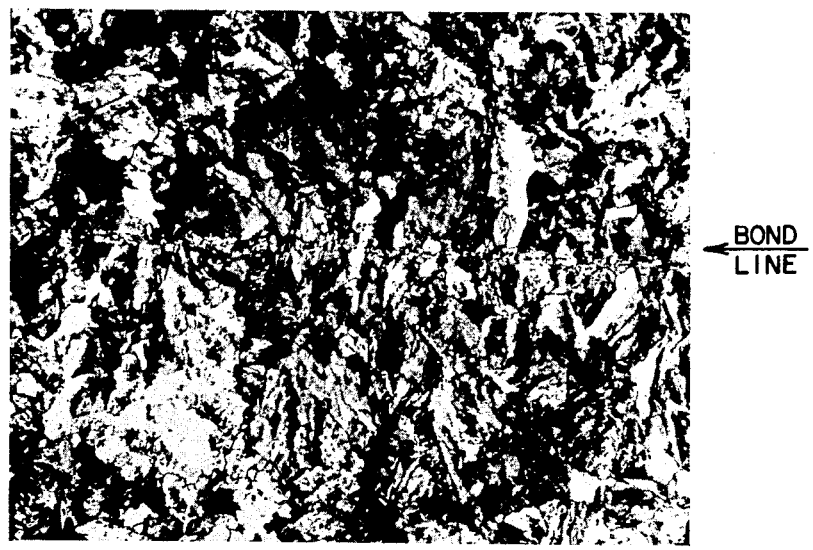
FIG. 4 is a photomicrograph of a cross-sectional surface of rail material repaired according to the process of this invention.

A means and apparatus for the practice of this invention, including a preferred embodiment, is shown in FIG. 1 in which a rail car 20 having a bed 21 is supported on trucks 22 at opposite ends. The trucks carry wheels 23 which roll on a track 24 made up of rails 25. The rails 25 are supported on ties 26 which are in turn supported on a road bed 27.

Conventionally, the rails 25 are constructed of steel which are spiked to ties 26 made of wood, resting on a road bed 27 of crushed stone.

The rail car 20 may be provided with internal motive means 30 such as a diesel engine, and be self-propelled under the guidance of an operator in a cab 31 at either end. Alternatively, the rail car 20 may be provided with couplings (not shown) and may be moved by other motive means.

Centrally positioned and supported on the bed 21 is a "strong back" frame portion 35 comprising beam members 36 and girder members 37. A longitudinally spaced apart pair of gripping means 38 is supported from the frame 35 in a manner operable to be raised and lowered under the control of operators. One gripping means 38 of the pair is on each side of a heating means 55.

Referring to FIG. 2, each gripping means 38 is typically shown as comprising, on opposite sides of the rail 25 and symmetrically configured, support arms 40 capable of movement up and down as shown by the arrows. The components of the gripping means 38 include fluid cylinders 41 containing pistons 42 operably connected to transverse acting piston rods 43 which carry grippers 44 having roughened faces 45.

In a manner not requiring detailed description to those skilled in the art, it will be understood that a fluid such as oil or air is operatively connected to either or both sides of the pistons 42 in the cylinders 41 to move the pistons back and forth. Fluid may be pressurized by one of the motorized generators and compressor sets 50, 51, and 52 in the car 20 (see FIG. 1). Under the influence of the fluid pressure the grippers 44 are driven against the sides of the rail 25 to effect a firm grip on the rail and to prevent movement of the rail.

Frame portion 35 is specially constructed with a configuration of the beam members 36, and girder members 37, as well as the support arms 40, to prevent other than negligible elongation of the longitudinal distance between the positions of the grippers 44 of each gripping means 38 in a pair, even when effected by substantial forces as will be later described in the operation of the process of the invention.

While it is generally conceived that the apparatus of this invention should preferably be constructed symmetrically in both the longitudinal and transverse directions, because of the substantial forces and loads to be carried, such symmetry is not essential if the components are properly and strongly constructed.

Therefore, because of the variety of rail cross-sectional shapes and sizes, it may be desirable to provide adjustment means to vary the total distance between the gripping means 38 in the longitudinally spaced pair, even if it disturbs the symmetry.

This is accomplished by adjustment of the position of one or both of the gripping means 38 in the longitudinal pair. Usually this will be done prior to the beginning of the repair process, as later described.

Referring now to FIG. 1 and FIG. 3, heating means 55 is supported on the frame portion 35 between the gripper means 38. The heating means 55 comprises a plurality of high frequency induction heating antennae elements 56 which are carried on a frame element 59. High frequency electromagnetic energy is supplied to the antennae elements 56 by one of the generator means 50, 51 or 52. The antennae elements 56 are in form of hollow sinuously configured tubing, which may be cooled by passing a heat conducting fluid 57 internally through the tubing. In the construction of the heating means 55, the antennae elements 56 are shaped, sized and positioned to create a predetermined heat and temperature distribution through the cross-section of the rail 25. Also means may be provided in the controls of the heating means 55 to carry a pattern of heat and temperature distribution in the rail 25 as determined by the operators.

A joint 58 is provided in the frame 59 by which the opposite sides of the heating means 55 are separated so that the heating means 55 may be raised and lowered as shown by the arrows FIG. 3.

While the heating means is shown as induction heating apparatus, which is preferred, other means such as gas flames, or oxyacetylene torches could be used if necessary or desired.

Figure 5:
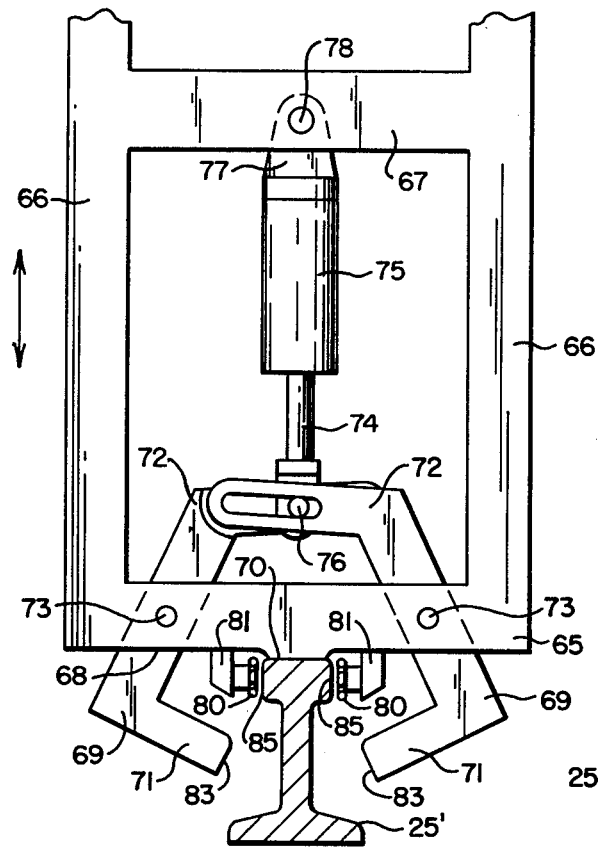
FIG. 5 is an elevational cross-section view of a portion of another embodiment of the apparatus of this invention, in the "open" position, taken along the line 3—3 of FIG. 1.
Figure 7:
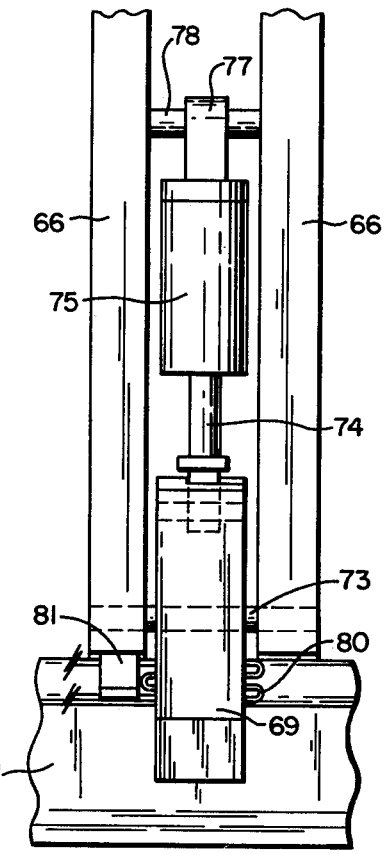
FIG. 7 is an elevational view of a side of the apparatus shown in FIGS. 5 and 6.
Figure 6:
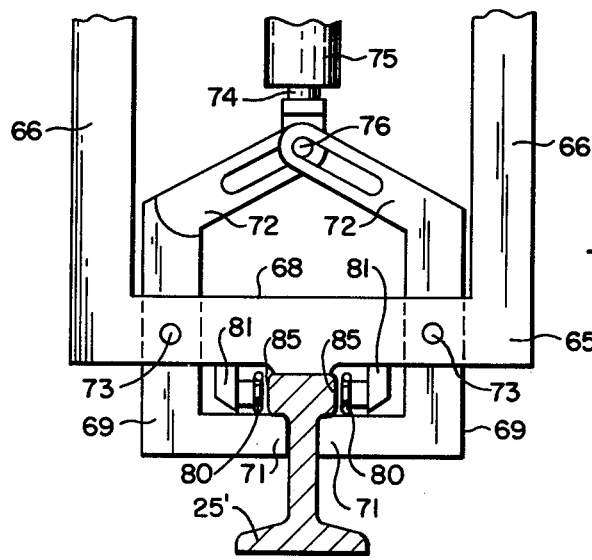
FIG. 6 is an elevational view of that portion of the apparatus shown in FIG. 5, in the "closed" position.

Referring again to FIG. 1, a crack detection means 60 supported from the bed 21 is positioned over and around the rail 25. Detection apparatus 60 may be any conventional well known system such as shear wave ultrasonics or radio metric systems. Typical of the ultrasonic device used for this purpose is a wheel or sled-type transducer assembly manufactured by Krautkramer-Branson, Stratford, CT., U.S.A The apparatus described above is for gripping and holding a rail against longitudinal elongation. Referring to FIGS. 5, 6, and 7 apparatus is shown for engaging and holding a rail against vertical expansion in a direction transverse and perpendicular to the longitudinal axis of the rail. This additional apparatus may be employed alternatively or simultaneously with the above described apparatus, as will be described later herein.

Referring to FIG. 5, a yoke-like frame 65 is constructed with descending arms 66, upper transverse members 67 and lower transverse members 68. Yoke-like frame 65 comprises spaced apart elements which pivotally support a plurality of clamp arms 69 on opposite sides of the rail 25'. Lower transverse members 68 are provided with an anvil surface 70 constructed and hardened for contact with the top of the rail 25'.

Clamp arm 69 is constructed with a vise finger 71 at the opposite end from a lever arm 72. Clamp arm 69 is pivotally supported in the frame 65 by a shaft 73 journaled between the opposite sides of the frame 65. Lever arm 72 is connected by a rotatable pin 76 to a piston rod 74 protruding from a cylinder 75.

The opposite end of the cylinder 75 is connected to the transverse members 67 by a link 77 and pin 78.

Heating apparatus means 80, typically of the induction type, is supported in close spaced relation to the sides of the rail 25'. The heating elements 80 may be supported on the lower transverse member 68 by a depending stanchion means 81.

As previously described with respect to the cylinders 41, a fluid such as oil or air is operatively connected to either or both sides of the pistons within cylinder 75 to move the pistons back and forth. The fluid is pressurized by one of the motorized generator compressor sets 50, 51, and 52 in the car 20 (see FIG. 1). Under the influence of the fluid pressure the clamp arms 69 are rotated to bring the vise 71 to the position shown in FIG. 6.

The position of heating means 55, heating elements 56, and heating means 80 is shown at positions believed to be preferred. Other positions may be suitable, selected by those skilled in the art, to provide a heating scheme within the rail 25, 25' that provides controlled temperature distribution across the rail cross-section, or at the positions where diffusion bonding is to take place. More or fewer heating elements may be found to be required.

The operation of the method and apparatus of this invention is in accordance with the following description.

The car 20 is operated longitudinally along the track 24 in the direction of the arrow shown above the car in FIG. 1, carrying operators and personnel to operate the system. The defect detection means 60 is supported over and around the rail 25 and provides a signal which indicates to the operators the presence and location of a defect or crack. The car 20 is then moved to a position where the heating means 55 is directly over the crack.

As a next step in the procedure, the gripping means 38 and the heating means 55 are lowered into position by vertical movement of the arms 40 and the frame 59. The heating means 55 is closed at the joint 58 and the grippers 44 are moved transversely to the positions shown in FIGS. 2 and 3.

In the preferred practice of the process of the invention, heat is next applied to the rail 25 by the heating means 55 and the temperature of the rail 25 is raised to a first preheat temperature to drive off moisture and prevent hydrogen embrittlement. Operable preheat temperatures are in a range of 100° to 500° F. and in the practice of repairing steel rails, a temperature near the upper limit of 500° F. is preferred.

When the preheat first temperature has been attained, the grippers 44 are operated to contact and firmly grip the rail 25 on each side of the web.

Further heat is then applied to raise the temperature of the rail to a second temperature high enough to create a compressive force at the crack sufficient to diffusion bond in the crack and on opposite sides of the crack at the second temperature, under the force of thermal expansion of the rail while substantially unyieldingly held a substantially fixed longitudinal distance between the gripping positions on the rail.

Diffusion bonding and the rate of diffusion action in various materials varies as a function of the material, time, pressure and temperatures. Therefore, various combinations of these parameters may be selected to successfully practice the invention. However, it is believed that in most practical instances, the second temperature should be at least about 1333° F. (the A-1 temperature) when the process is practiced on conventional steel rails. Preferably, heat is applied to raise the rail to a second temperature of about 1750° F. to shorten the time involved in the process. At a temperature of about 1750° F. the time has been found to be at least about two minutes.

The compression needed to promote diffusion along the transverse crack line is readily provided by axial constraint at the ends of the heated region. Uniform compression of the section can be achieved by symmetric heating with the heat flux determined by the cross-sectional properties and conduction characteristics of the material. Because the section is usually only partly cracked, geometric instability under the compression loading is unlikely, particularly in view of the short unsupported length which is under compression with this practice.

It has been found that impurities present along the crack plane readily diffuse into the material, away from the crack line, and consequently diffusion bonding is achieved and the crack is converted into a homogeneous material where the repair has taken place.

After the time required for a successful diffusion bond with the process control parameters that have been used, the element is allowed to cool and the grippers are released. If time is available the rail may be allowed to cool sufficiently that the compression loading is relieved before the grippers are released. However, the amount of cooling before release is not critical and the timing may be according to other operating conditions.

In the final operations of the apparatus, the gripping means 38 and the heating means 55 are raised to the upper-transport position. The car is then moved so that the detection means 60 is over the place where the crack previously existed. A check may then be made to determine if the repair has been successful. In an alternative apparatus construction, an additional detection apparatus 60 may be provided on the opposite side of the frame portion 35, so that the car does not have to back up to determine if the repair has been successful.

If it has been determined that a crack is longitudinal or at an angle other than substantially transverse, the apparatus shown in FIGS. 5, 6, and 7 may be operated to provide transverse/lateral pressure on the rail.

This is accomplished during the process when the car 20 is positioned with the frame 65 centrally positioned over a crack and the clamp arm 69 "on line" with the crack. The yoke frame 65 is lowered to the position shown in FIG. 5. With the clamp arms 69 open, the ends 83 pass the sides of the rail 25' in the downward travel. With the anvil 70 in contact at the top of the rail 25', the cylinder 75 and piston therein are actuated with an upward force on the pin 76, rotating the clamp arm to the clamped position, as shown in FIG. 6. Heat is applied through the heating means 81 and/or through other heating means not shown but substantially as described above with reference to the longitudinal apparatus.

Sufficient force is applied between the vise finger 71 and the anvil 70 to maintain the distance therebetween substantially the same as an unyielding force, when the temperature in the rail is raised to a level sufficient to diffusion bond transverse/lateral cracks.

Although the operation of apparatus of FIGS. 1, 2, and 3 as well as the apparatus shown in FIGS. 5, 6, and 7 have been discussed separately, it should be understood that with appropriate design and construction they could be operated simultaneously and cracks at an angle to longitudinal, transverse or lateral planes can also be repaired.

The apparatus shown in FIGS. 5, 6, and 7 will apply substantially unyielding force between the vise finger 71 and the anvil 70 which will have the most influence on cracks that are in a plane perpendicular to the line of force between these two surfaces. These cracks are generally termed lateral cracks.

Each rail, of course, has side surfaces 85 which could be used as clamping surfaces for the direct application of unyielding forces perpendicular to cracks that are transverse in a vertical plane and longitudinal in the rails 25, 25'. In a manner similar to that shown for transverse cracks (FIGS. 1, 2, and 3) and for lateral longitudinal cracks (FIGS. 5, 6, and 7), apparatus can be constructed to provide unyielding force against the sides 85 of the rail 25, 25' (not shown) for applying this unyielding force in the repair of longitudinal vertical cracks.

Heating means such as heating means 57, 56, and 81 could be constructed to apply heat at the top and undersides of the rail as necessary to create the temperature for thermal expansion and fusion bonding.

With the apparatus shown and described, the method of this invention can be practiced to repair tracks with substantially any or all orientations within the rail. It is believed that the method is therefore universally applicable to the repair of defects and/or cracks frequently found in rails and other structural elements.

While the preferred embodiment of the practice of this invention includes the preheating step of raising the rail or element to a first temperature before it is gripped, the practice of the invention may in some circumstances, be done without this preheating step. The primary purpose of the preheating step is to reduce and control the temperature differential to which the material is subjected in the compression step, when the process is practiced with steel materials and those having a similar yield point. With other materials there may be no problem in connection with the yield point if the material and the first preheat step may be unnecessary.

Referring to FIG. 4, metallographic studies of diffusion repair bonds in rail materials indicate a sound metallurgical bond is developed. Typical of this finding are the results presented in FIG. 4. This micrograph of the bond lines in samples was obtained in a procedural test ten minute cycle at nominally 5 KSI (5,000 lbs. per sq. in.) stress at a temperature between 1700° and 1800° F. The bond line is indicated by a fine band containing well dispersed free ferrite. Most significantly, it is to be noted that the bond is complete as evident in phases that develop across the bond line, all along the bond. Such development is clear evidence that conditions necessary to promote diffusion were developed in this rail steel.

In the micrograph of FIG. 4, the crack was oxidized (rusted) to develop conditions that reflect crack surfaces exposed to the environment. The bond line is not affected by the oxidization at the crack. Thus cracks which are rusted will not limit the utility of this process in practice. The micrograph is at a magnification of 250X.

Regarding bonding pressures, compressive stresses of 5 KSI on a typical rail cross-section are equivalent to loads of about 50 KIPS. Considering that this load is developed by actual restraint of the rail during local heating, and assuming that the temperature will average 1270° F. along a one inch slice on either side of the crack, one can calculate that this force is developed. Stresses of at least 3.5 KSI are believed necessary when working with steel.

It is desirable, however, to develop this force by elastic deformation and therefore the temperature differential under which the load is applied should be controlled to a minimum. This will prevent large strains that would yield in compression and/or leave a residual tensile force upon cooling. This is accomplished by (1) preheating the rail before the grippers are applied, (2) selective heating very local to the crack, and (3) more uniform heating at much lower temperatures away from the crack. All of this can be controlled by a heating scheme that provides controlled temperature distribution across the rail cross-section.

While the apparatus and method of this invention have been disclosed primarily with respect to the repair of steel rails, there are other structural load bearing elements made from various materials where it would be advantageous to repair defects in situ with the process of the invention. To the degree that the process is applicable to the repair of these elements, it is intended that the disclosure and claims shall apply thereto if it is theoretically and/or practically consistent.

It is herein understood that although the present invention has been specifically disclosed with the preferred embodiments and examples, modifications and variations of the concepts herein disclosed may be resorted to by those skilled in the art. Such modifications and variations are considered to be with the scope of the invention and the appended claims.

What is claimed is:

1. A method of repairing a crack in the material of a steel rail in situ comprising:
   a. heating the rail at the crack and in the vicinity of the crack to a first temperature,
   b. gripping the rail at positions on opposite sides of the crack with unyielding means to hold the rail with a substantially fixed distance between the gripping positions on the rail, c. heating the rail to a second temperature to create a compressive force and pressure at the crack sufficient to diffusion bond the opposite sides of the crack at the second temperature, under the force of thermal expansion of the rail, the second temperature being higher than the diffusion bonding temperature of the steel material at the pressure in the crack, in the absence of adding substantially any material, and d. cooling the rail and releasing the rail.

2. A method according to claim 1 wherein the first temperature is between about 100° and 500° F.

3. A method according to claim 1 wherein the second temperature is about 1333° F. to 2000° F.

4. A method according to claim 10 wherein the rail is heated to the second temperature for at least about two minutes.

5. A method according to claim 1 wherein the force of thermal expansion created by heating from the first temperature to the second temperature creates a stress of at least about 3.5 KSI.

6. A method according to claim 1 wherein the rail is heated by electrical induction.

7. A method according to claim 14 wherein the induction heating is applied to the rail in localized variation around the periphery of the rail to provide controlled temperature distribution in the rail according to a predetermined scheme.

8. An apparatus for repairing defects in the material of steel rails comprising:

a. means for moving a frame into a position along the length of a substantially continuous rail in situ, b. means for unyieldingly gripping the steel rail at first and second spaced apart positions, the frame supporting and holding the gripping means at a substantially fixed distance apart during the operation of the apparatus, c. means for heating the steel rail material at a position substantially midway between the gripping means to a temperature sufficient to cause diffusion bonding of the material of the rail in and near the midway position, d. means for controlling the heating means to maintain the diffusion bonding temperature for a predetermined period of time, and e. means for discontinuing the operation of the heating means and for releasing the gripping means.

9. An apparatus according to claim 8 wherein the means for supporting and holding the gripping means is a connecting frame.

10. An apparatus according to claim 8 wherein the means for gripping the rail, supporting and holding the gripping means, and heating the steel rail are constructed to fit around and operatively influence the shape and properties of a rail, and wherein the substantially fixed distance is both longitudinal and transverse with respect to the longitudinal axis of the rail.

11. A method of repairing defects in a structural material element according to claim 1 wherein Step b. includes heating the element by electrical induction to a second temperature of between about 1333° F. and about 2000° F. for at least about two minutes to create a compressive force and pressure of at least about 3.5 ksi at the defect under the force of thermal expansion of the element, the second temperature being higher than the diffusion bonding temperature of the material at the pressure in the defect.

12. A method of repairing a crack in a rail of steel material according to claim 1 wherein Step a. includes heating the rail at the crack and in the vicinity of the crack to a first temperature of at least about 100° F., and Step c. includes heating the rail by electrical induction to a second temperature of between about 1333° F. and 2000° F. for at least about two minutes to create a compressive force and pressure at the crack of at least about 3.5 ksi under the force of thermal expansion of the rail, the second temperature being higher than the diffusion bonding temperature of the material at the pressure in the crack.

* * * * *